US011304373B2

(12) United States Patent
Barager et al.

(10) Patent No.: US 11,304,373 B2
(45) Date of Patent: Apr. 19, 2022

(54) BALE PROCESSOR WITH EXTENDED CARRYING CAPACITY AND INTERMEDIARY BALE HOLDER FOR EXTENDING THE CARRYING CAPACITY OF EXISTING BALE PROCESSOR

(71) Applicant: Bridgeview Mfg. Inc., Gerald (CA)

(72) Inventors: Dean Barager, Esterhazy (CA); Raymond Helmeczi, Esterhazy (CA); Kristofor Ohnander, Stockholm (CA)

(73) Assignee: Bridgeview Mfg. Inc., Gerald (CA)

( * ) Notice: Subject to any disclaimer, the term of this patent is extended or adjusted under 35 U.S.C. 154(b) by 283 days.

(21) Appl. No.: 16/415,359

(22) Filed: May 17, 2019

(65) Prior Publication Data
US 2019/0350139 A1 Nov. 21, 2019

Related U.S. Application Data

(60) Provisional application No. 62/673,315, filed on May 18, 2018.

(51) Int. Cl.
*A01F 29/10* (2006.01)
*A01F 29/00* (2006.01)
*A01F 29/04* (2006.01)

(52) U.S. Cl.
CPC .......... *A01F 29/10* (2013.01); *A01F 29/005* (2013.01); *A01F 29/04* (2013.01)

(58) Field of Classification Search
CPC ........ A01F 29/10; A01F 29/005; A01F 29/02; A01F 29/024; A01F 29/025
See application file for complete search history.

(56) References Cited

U.S. PATENT DOCUMENTS

| 3,006,489 | A | * | 10/1961 | Ealet | B62D 49/02 414/739 |
| 3,877,595 | A | * | 4/1975 | Edelman | A01D 87/127 414/24.5 |
| 4,043,461 | A | * | 8/1977 | Castro | A01D 85/005 198/374 |
| 4,068,804 | A | * | 1/1978 | Butler | A01F 29/005 239/651 |
| 4,088,272 | A | * | 5/1978 | Grillot | A01F 29/005 241/30 |
| 4,232,986 | A | * | 11/1980 | Johnson | A01D 90/083 414/24.5 |
| 4,329,101 | A | * | 5/1982 | Green | A01D 90/083 414/111 |
| 4,376,607 | A | * | 3/1983 | Gibson | A01D 90/083 241/101.76 |

(Continued)

*Primary Examiner* — Gregory D Swiatocha
*Assistant Examiner* — Bobby Yeonjin Kim
(74) *Attorney, Agent, or Firm* — Byrne Poh LLP

(57) ABSTRACT

A bale processor with extended bale capacity and a kit for extending a bale capacity of a bale processor is disclosed. The extended bale capacity is provided by a bale holder mechanically coupled to the frame the bale processor. When in use, the bale holder is capable of supporting an additional bale in an intermediary position between a first bale above a disintegration rotor of the bale processor and a second bale supported by a bale carrier of the bale processor. The kit comprises an intermediary bale holder and a support frame mechanically mountable to a back section of a bale processor.

26 Claims, 15 Drawing Sheets

(56) References Cited

U.S. PATENT DOCUMENTS

| | | | | | |
|---|---|---|---|---|---|
| 4,441,845 | A | * | 4/1984 | Gibson | A01D 90/08 414/111 |
| 4,524,916 | A | * | 6/1985 | Keyes | A01D 87/127 241/101.76 |
| 4,537,548 | A | * | 8/1985 | Lockhart | A01D 90/083 414/111 |
| 4,621,776 | A | * | 11/1986 | Hostetler | A01D 87/127 241/101.76 |
| 5,209,413 | A | * | 5/1993 | Dwyer | A01F 29/005 241/101.76 |
| 5,505,391 | A | * | 4/1996 | Krueger | A01F 29/005 241/186.35 |
| 5,639,199 | A | * | 6/1997 | Connell, Jr. | A01D 90/083 414/111 |
| 6,478,522 | B2 | * | 11/2002 | Babb | A01D 90/083 298/18 |
| 7,004,706 | B1 | * | 2/2006 | Wilson | A01D 90/083 414/111 |
| 7,651,043 | B2 | * | 1/2010 | Hoovestol | A01F 29/005 241/189.1 |
| 8,152,429 | B2 | * | 4/2012 | Rennie | A01D 85/005 414/111 |
| 2002/0084371 | A1 | * | 7/2002 | Hruska | A01F 29/005 241/101.763 |
| 2014/0326817 | A1 | * | 11/2014 | Wentz | B02C 18/22 241/101.76 |

* cited by examiner

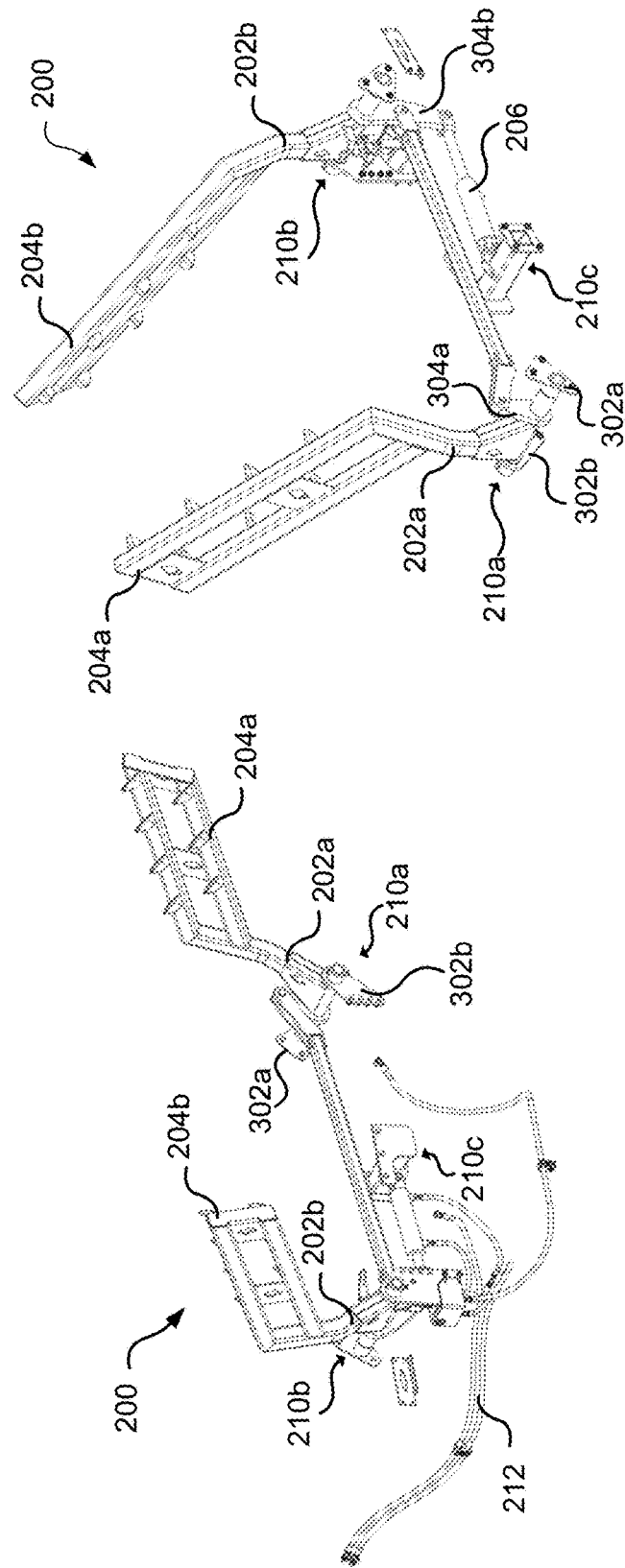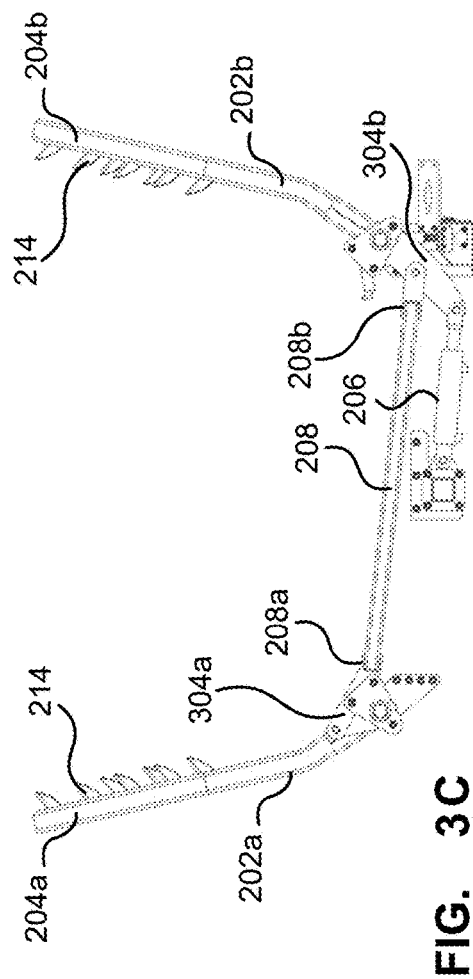
FIG. 3A
FIG. 3B
FIG. 3C

BALE PROCESSOR WITH EXTENDED CARRYING CAPACITY AND INTERMEDIARY BALE HOLDER FOR EXTENDING THE CARRYING CAPACITY OF EXISTING BALE PROCESSOR

RELATED APPLICATIONS

The current application claims priority to U.S. Provisional Application 62/673,315 filed May 18, 2018, and Canadian Patent Application 3,036,263 filed Mar. 11, 2019, the entire contents of which are incorporated herein by reference in their entirety.

TECHNICAL FIELD

The current disclosure relates to bale processor and in particular to extending the bale-carrying capacity of bale rippers.

BACKGROUND

Feeding and bedding material, such as hay, straw, etc., is often formed into bales to facilitate transportation and storage. When the baled material is to be used, the bales may be shredded or torn apart to provide the loose material. This shredding may be done by a bale processor, which is often towed behind a tractor. In use, bales may be transported from a storage location to the location to be shredded. A bale may be loaded into the bale ripper and transported to the location of use. In order to increase the number of bales that may be transported between the storage location and use location, bale rippers are often fitted with a set of carrying forks on the rear of the bale ripper that can carry an additional bale. When transporting bales, one bale may be loaded into the bale ripper and a second bale carried by the carrying forks. When in use, the carrying forks can deposit the second bale into the bale processor to be shredded. The carrying forks can effectively double the carrying capacity of the bale ripper, which can significantly reduce non-working time spent travelling between a storage location and a use location.

The carrying capacity of bale rippers can be further increased by a trailer that can carry additional bales. While such trailers may significantly extend the carrying capacity, it also extends the overall length of the bale ripper, which can make it difficult to navigate during transportation, particularly in tight locations.

It is desirable to further extend the bale carrying capacity of bale rippers without extending the overall length of bale rippers.

BRIEF DESCRIPTION OF THE DRAWINGS

The present disclosure will be better understood with reference to the drawings, in which:

FIGS. 3A-C show detailed views of the intermediary bale holder;

It will be noted that throughout the appended drawings, like features are identified by like reference numerals.

DETAILED DESCRIPTION

Figure 1:
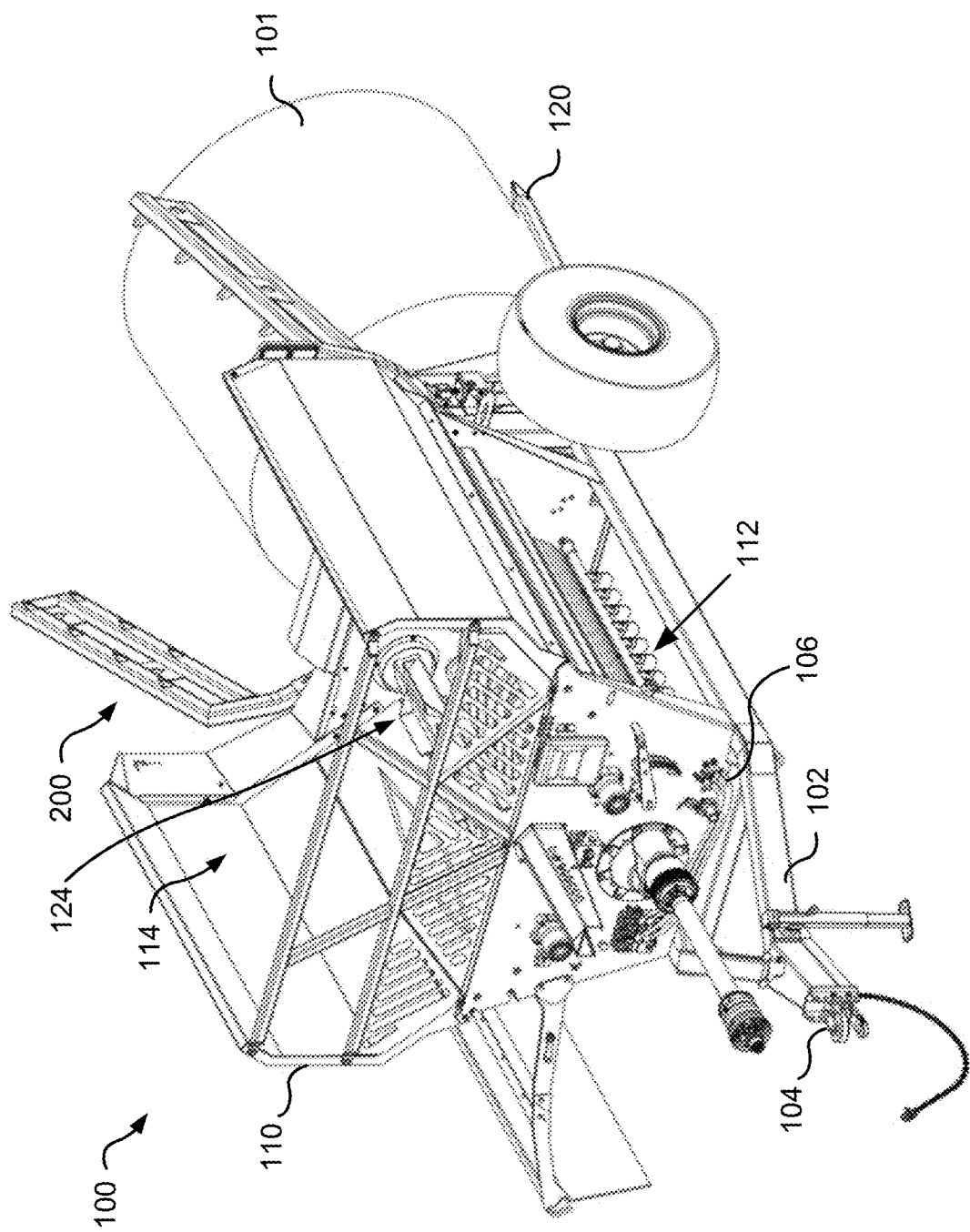
FIG. 1 shows a representation of a bale processor in accordance with some embodiments of the present disclosure.

In accordance with the present disclosure there is provided a bale processor comprising: a frame supporting a bale disintegration rotor, the frame sized to support a bale in a disintegration housing above the disintegration rotor; a bale carrier moveably coupled to the frame at a back section of the frame and moveable between a transport position and a delivery position, the transport position capable of supporting the bale above a ground surface and the delivery position capable of delivering the bale supported on the bale carrier to the disintegration housing; a holding arm moveably coupled to the back section of the frame; and an actuation device coupled to the holding arm for controllably positioning the holding arm between at least two positions comprising: a holding position supporting the bale, when in use, in an intermediary position between a bale carrier of the bale processor and a disintegration rotor of the bale processor; and a releasing position releasing the bale.

In a further embodiment of the bale processor, the intermediary bale holder further comprises a second holding arm, wherein the holding arm and the second holding arm are arranged at opposite sides of the bale when the intermediary bale holder is mounted to the bale processor and is supporting the bale.

In a further embodiment of the bale processor, the holding arm and second holding arm are each coupled to the frame at a respective pivotal connection and are pivotable about a horizontal axis that is parallel to a longitudinal axis of the bale processor.

In a further embodiment of the bale processor, the intermediary bale holder further comprises a mechanical linkage connecting the holding arm and the second holding arm to move the holding arm and second holding arm between the holding position and the releasing position using the actuation device.

In a further embodiment of the bale processor, the mechanical linkage is coupled to one of the holding arm and second holding arm above the respective pivotal connection and is coupled to the other one of the holding arm and second holding arm below the respective pivotal connection.

In a further embodiment of the bale processor, the actuation device is further coupled with the second holding arm and configured to move the second holding arm relative to the frame of the bale processor.

In a further embodiment of the bale processor, the intermediary bale holder further comprises a second actuation coupled with the second holding arm and configured to move the second holding arm relative to the frame of the bale processor.

In a further embodiment of the bale processor, an end of the holding arm is configured to move towards and away from an end of the second holding arm.

In a further embodiment of the bale processor, at least one of the holding arm and the second holding arm is pivotable about a vertical axis that is perpendicular to a longitudinal axis of the bale processor.

In a further embodiment of the bale processor, the holding arm comprises a plurality of bale gripping teeth pitched at an angle of between 45 and 75 degrees from the holding arm.

In a further embodiment of the bale processor, the holding arm is pivotable about a horizontal axis that is perpendicular to a longitudinal axis of the bale processor.

In a further embodiment of the bale processor, the holding arm provides an extended platform supporting a bottom of the bale when in the holding position.

In a further embodiment of the bale processor, the bale processor further comprises a member for mechanical connection to a tow vehicle, and wherein the bale processor further comprises control lines for connection to the tow vehicle, the control lines coupled with the bale disintegration rotor, the bale carrier, and the intermediary bale holder to allow control thereof.

In accordance with the present disclosure there is further provided an intermediary bale holder for mounting to a bale processor, comprising: a mounting frame mountable to the bale processor; and a holding arm moveably coupled to the mounting frame, the holding arm positionable between at least two positions comprising: a holding position supporting a bale, when in use with the intermediary bale holder mounted to the bale processor, in an intermediary position between a bale carrier of the bale processor and a disintegration rotor of the bale processor, thereby extending a bale-carrying capacity of the bale processor, and a releasing position releasing the bale.

In an embodiment, the intermediary bale holder further comprises an actuation device coupled to the holding arm and controllable to position the arm between the holding position and the releasing position.

In an embodiment, the intermediary bale holder further comprises a second holding arm, wherein the holding arm and the second holding arm are arranged at opposite sides of the bale when the intermediary bale holder is mounted to the bale processor and is supporting the bale.

In an embodiment of the intermediary bale holder, the holding arm and second holding arm are each coupled to the mounting frame at a respective pivotal connection and are pivotable about a horizontal axis that is parallel to a longitudinal axis of the bale processor.

In an embodiment of the intermediary bale holder, the intermediary bale holder further comprises a mechanical linkage connecting the holding arm and the second holding arm to move the holding arm and second holding arm between the holding position and the releasing position using a single actuator.

In an embodiment of the intermediary bale holder, the mechanical linkage is coupled to one of the holding arm and second holding arm above the respective pivotal connection and is coupled to the other one of the holding arm and second holding arm below the respective pivotal connection.

In an embodiment of the intermediary bale holder, the actuation device is further coupled with the second holding arm and configured to move the second holding arm relative to the frame of the bale processor.

In an embodiment, the intermediary bale holder further comprises a second actuation coupled with the second holding arm and configured to move the second holding arm relative to the frame of the bale processor.

In an embodiment of the intermediary bale holder, an end of the holding arm is configured to move towards and away from an end of the second holding arm.

In an embodiment of the intermediary bale holder, at least one of the holding arm and the second holding arm is pivotable about a vertical axis that is perpendicular to a longitudinal axis of the bale processor.

In an embodiment of the intermediary bale holder, the holding arm comprises a plurality of bale gripping teeth pitched upwards at an angle of between 45 and 75 degrees from the holding arm.

In an embodiment of the intermediary bale holder, the holding arm is pivotable about a horizontal axis that is perpendicular to a longitudinal axis of the bale processor.

In an embodiment of the intermediary bale holder, the holding arm provides an extended platform supporting a bottom of the bale when in the holding position.

The number of bales that can be transported by bale processor may be increased by an intermediary bale holder. Typically a bale processor will be able to carry two bales, with one being held in the processor and the second held on carrying forks. Bale processor with an intermediary bale processor can carry an additional bale. The intermediary bale holder may be incorporated into new bale processors or provided as a kit for retrofitting existing bale processors to provide extended carrying capacity. The intermediary bale holder disclosed herein is capable of holding an additional bale during transportation, without increasing an overall length of the bale processor. The intermediary bale holder can be incorporated into new bale processors, and can also be retrofitted to existing bale processors. Accordingly, more bales can be transported from a storage location to a use location in less time without compromising the handling and maneuverability of the bale processor.

As described in further detail below, the intermediary bale holder is located between the tub of the bale processor that holds a bale being processed and bale carrying forks. The intermediary bale holder has a holding arm that is moveable via an actuation device between a holding position for supporting the additional bale and a releasing position for releasing the bale. The intermediary bale holder may use a single holding arm or at least a pair of holding arms, with one or both of the holding arms being moveable so as to provide the holding position and the releasing position. In use, a first bale may be deposited from the bale carrying forks into the tub using the bale carrying forks and a second bale may then be positioned into an intermediary position using the bale carrying forks where the holding arm(s) of the intermediary bale holder move to the holding position for supporting the second bale. With the second bale held by the intermediary bale holder, the bale forks are able to pick up a third bale for transport.

A bale processor with the intermediary bale holder, whether manufactured as such or assembled by mounting the intermediary bale holder to the bale processor, allows the bale processor to carry an additional bale to the processing area/use location. The extra bale that can be carried by the bale processor using the intermediary bale holder is securely held by the holding arm(s) of the intermediary bale holder.

Accordingly, the bale processor has increased bale carrying capacity without extending the overall length of the bale processor.

Embodiments are described below, by way of example only, with reference to FIGS. 1-15.

FIG. 1 depicts a bale processor 100 in accordance with the present disclosure. The bale processor 100 is depicted as carrying a single bale 101 on bale carrier 120, however it will be appreciated that additional bales may be carried. The bale processor 100 may comprise a support structure 102 for supporting elements of the bale processor. The bale processor 100 may also comprise a tow member 104 attached to the support structure 102 for mechanical connection to a tractor or other suitable tow vehicle (not shown). As depicted in FIG. 1, the tow member 104 may be for example a tow hitch or other means of connection to provide mechanical connection to a tractor. The bale processor 100 may also comprise control lines 106 for connection to the tow vehicle. The operator of the tow vehicle may be provided with a control interface inside the operator's cabin so that the operator can control operation of the bale processor 100. The control lines 106 may be hydraulic lines, air lines, mechanical linkages and/or electrical wires depending upon the type of actuator controls used.

The bale processor 100 comprises a frame 110 supported by the support structure 102. The frame 110 supports a disintegration rotor 112, and defines a disintegration housing 114 that is above a disintegration rotor 112. The frame 110 and the disintegration housing 114 are sized to support a bale above the disintegration rotor 112. In use, the disintegration rotor 112 can be rotated to pull apart the bale for distribution on the ground below. The disintegration rotor 112 may be coupled with the control lines 106 allowing the operator to control the disintegration rotor 112 from the tractor. The bale processor may further comprise a chute or other form of diversion element to direct the distribution of the pulled-apart bale material. The bale processor may include one or more bale manipulation rollers 124 that can be controlled to rotate the bale as it is disintegrated.

The bale processor further comprises the bale carrier 120 capable of carrying the bale 101. The bale carrier 120 may comprise two forks, depicted as forks 122a-b of bale carrier 120 in FIG. 5, to support a bale, although other means to support and carry the bale are possible. For example, the bale carrier 120 may instead comprise a platform or flat surface to support the bale. The bale carrier 120 may be mechanically coupled, either directly or indirectly, to the support structure 102 or frame 110 at a back section of the bale processor 100. For the purpose of this disclosure, the front/back sections of the bale processor 100 are considered with reference to the tow direction, and accordingly a front section is considered to be proximate to the tow member 104 for mechanical connection to the tow vehicle, and the back section is considered to be toward the opposite end of the bale processor 100 from the member 104. The mechanical coupling of the bale carrier 120 to the support structure 102 or frame 110 in this embodiment allows for rotation of the bale carrier 120 relative to the frame 110, as may be seen in FIGS. 4 and 5, for example. However in some embodiments the mechanical connection may allow for one or more of rotational motion and linear motion, including in the front/back direction as well as up/down direction.

The bale carrier 120 is thus moveable between several positions allowing bales to be picked from the ground and deposited into the disintegration housing 114. The bale carrier 120 may be moved to a transport position, as depicted in FIG. 1 for example, which is capable of supporting a bale above a ground surface during transportation. The bale carrier 120 may also be moved to a delivery position, as will be further described with reference to FIG. 4. The delivery position delivers a bale to the disintegration housing 114. The bale carrier 120 may be moved to a loading position, which facilitates loading of the bale onto the bale carrier 120 by positioning the forks on or near the ground level. The bale carrier 120 may still further be moved to a transfer position which facilitates transferring a bale from the bale carrier 120 to an intermediary bale holder 200, as will be further described herein. The bale carrier 120 may be moved between the positions by an actuator controlled via one or more of the control lines 106.

Figure 10:
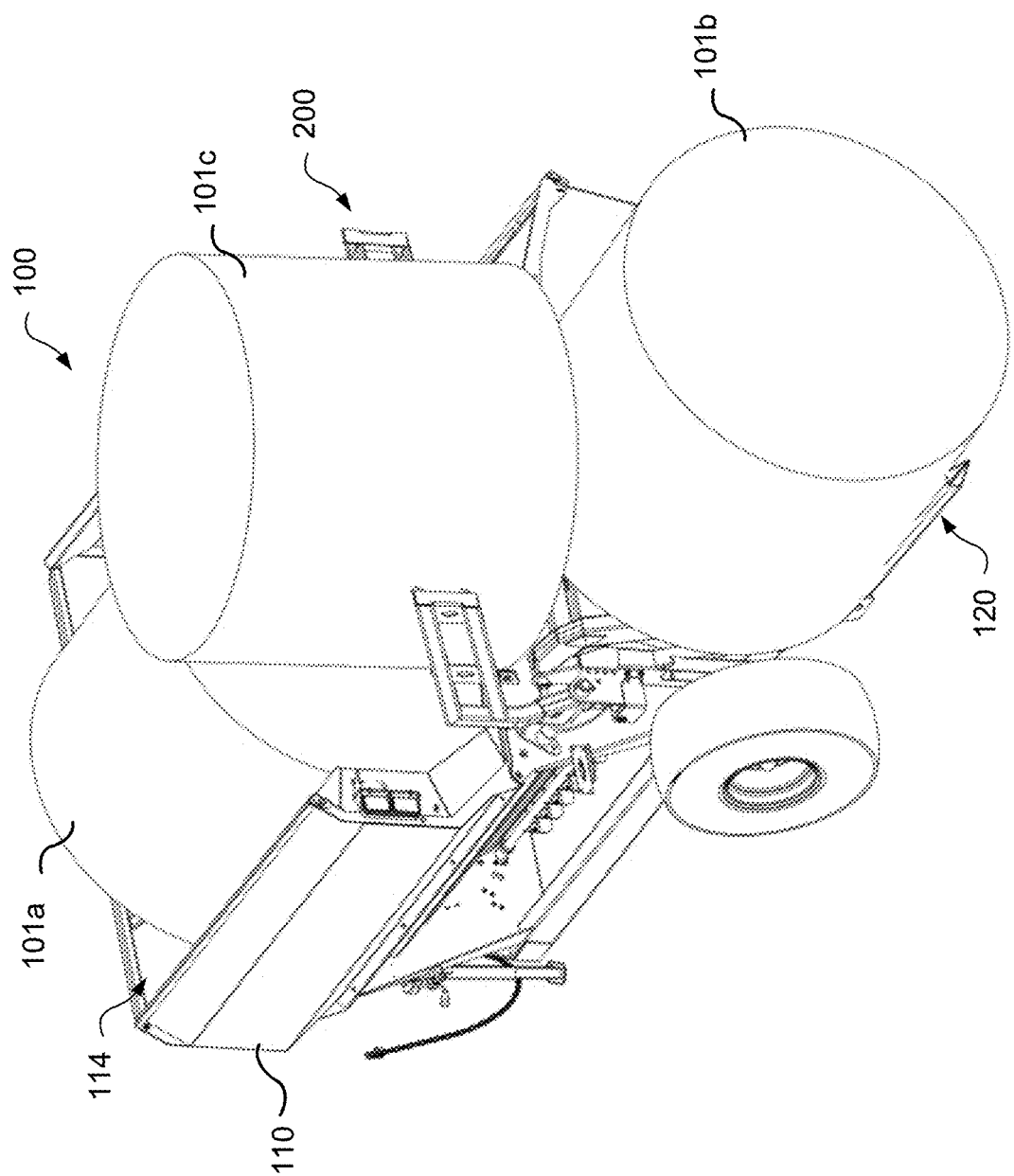
FIG. 10 shows a sixth bale-carrying configuration of the bale processor.

The bale processor 100 further comprises an intermediary bale holder 200, which allows for the bale processor to hold an additional bale during transportation. The additional bale is held by the intermediary bale holder 200 above a bale carried by the carrier 120 and as such can extend the transportation capacity without extending the overall length of the bale processor 100. The intermediary bale holder 200 may be mechanically connected, either directly or indirectly, to the back section of the support structure 102 or frame 110. The intermediary bale holder 200 is capable of supporting a bale in an intermediary position between a bale supported in the disintegration housing 114 and a bale supported by the bale carrier 120. A bale processor 100 transporting three bales is shown in FIG. 10.

The bale processor 100 may be manufactured with the intermediary bale holder 200 included as an integral component. Alternatively, the intermediary bale holder 200 may be sold separately and/or included as part of a kit that can be used to retrofit existing bale processors to extend the bale-carrying capacity thereof.

Figure 2:
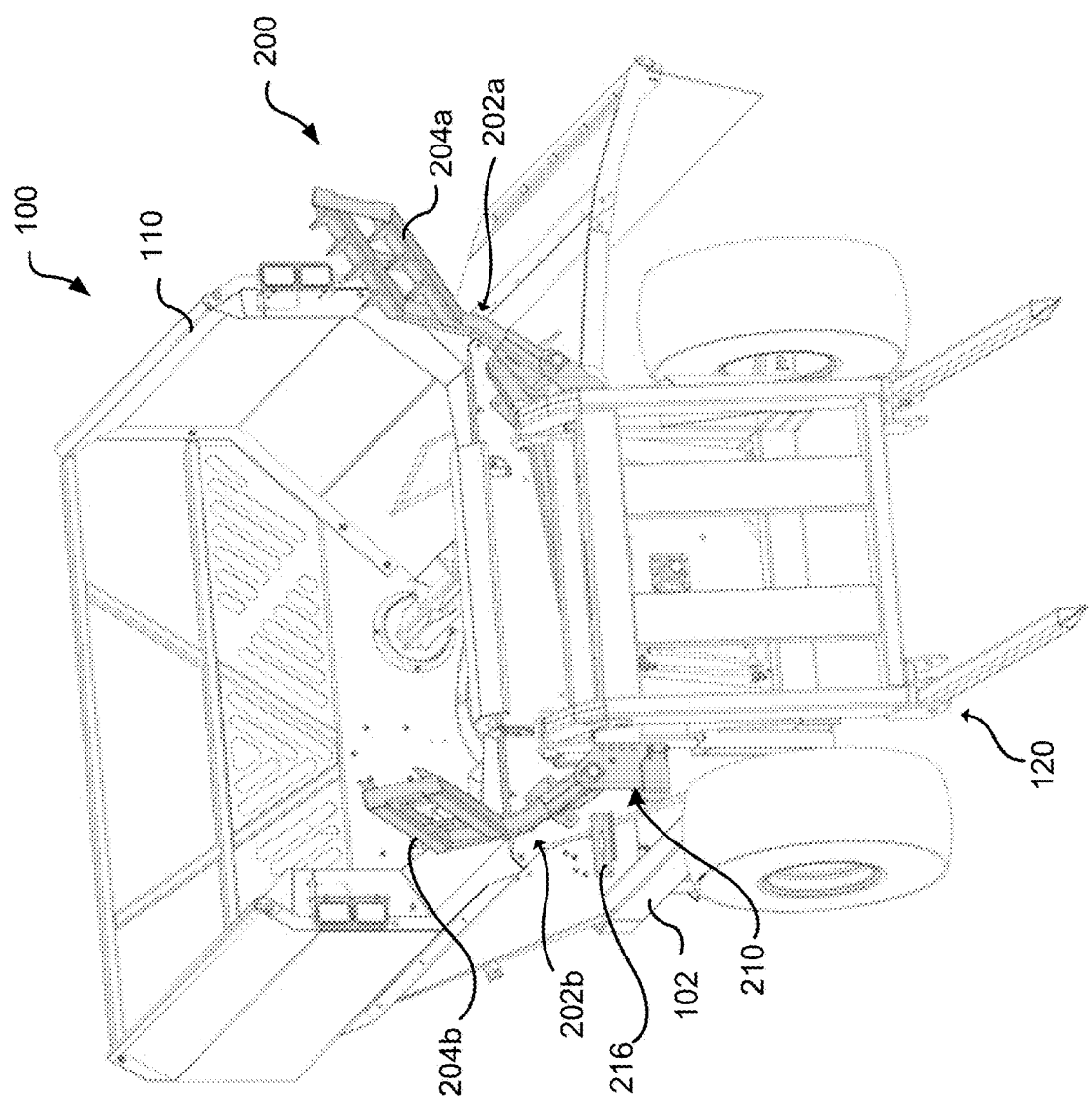
FIG. 2 shows a detailed view of an intermediary bale holder attached to the bale processor.

FIG. 2 depicts an intermediary bale holder 200 attached to the bale processor 100. The intermediary bale holder 200 is attached to a rear section of the bale processor 100. As depicted, the intermediary bale holder 200 comprises a pair of holding arms 202a, 202b. The first and second holding arms 202a, 202b are each arranged at respective sides of the frame 110 so that the arms are located on opposite sides of a bale when carried by the intermediary bale holder 200. The holding arms 202a, 202b are arranged so as not to interfere with movement of the bale carrier 120 when the holding arms 202a, 202b are not being used to support a bale. As will be described further with reference to FIGS. 3A-C, the intermediary bale holder 200 further comprises an actuation device (not clearly shown in FIG. 2) that is used to move the holding arms 202a, 202b in order to hold or release bales. Although both holding arms 202a, 202b are depicted as being moveable, it is possible that only a single holding arm is moveable while another holding arm is stationary. The holding arms 202a, 202b are moveable between a holding position that is capable of supporting a bale, and a releasing position for releasing the bale. The holding arms 202a, 202b may each comprise respective end sections 204a, 204b that can contact and hold a bale positioned there-between. If only one of the holding arms is moveable, then the end of the moveable holding arm moves toward the end of the stationary holding arm to squeeze the bale there-between. In some aspects, the end sections 204a, 204b may be designed to enhance the supporting of the bale, such as with the inclusion of gripping means comprising a plurality of teeth or angled projections.

Taking a longitudinal axis of the bale processor 100 to be in a front-back direction, which is generally also a direction along which the disintegration rotor 112 is arranged in the disintegration housing 114, the end sections 204a, 204b of the holding arms 202a, 202b may be configured to move towards and away from each other generally in a direction that is generally horizontal and perpendicular to the longitudinal axis (in the left-right direction). That is the end sections 204a, 204b move towards and away from a longitudinal centerline of the bale processor 100. The end sections 204a, 204b of the holding arms 202a, 202b move towards each other into the holding position for supporting the bale, and away from each other to the releasing position for releasing the bale. In the releasing position, the holding arms 202a, 202b and the ends 204a, 204b of the holding arms are spaced far enough apart so as to not interfere with the movement of the bale carrier 120. The holding arms 202a, 202b are depicted as being pivotable about a horizontal axis that is parallel to the longitudinal axis of the bale processor 100. It would be appreciated by a person skilled in the art, however, the holding arms may be moveable in a variety of ways including pivoting about a vertical axis, pivoting about a horizontal axis perpendicular to the longitudinal axis, moving linearly or some combination thereof.

For example, it would also be appreciated by a skilled person that movement of the end sections 204a, 204b of the holding arms 202a, 202b may be a combination of both rotational and linear movement in order to move the holding arms 202a, 202b into a position capable of supporting a bale, and may depend on the configuration of the holding arms 202a, 202b and the mechanism used to actuate the holding arms 202a, 202b. Additionally, it would be appreciated that the end sections 204a, 204b of the holding arms 202a, 202b may also be moved, either linearly or rotationally, in other directions such as up-down, front-back, or left-right. For example, movement of the end sections 204a, 204b when the holding arms 202a, 202b are moved between a holding position and a releasing position may encompass movement not just in the left-right direction but also in the up-down and/or front-back directions.

The intermediary bale holder 200 is mechanically coupled to the frame 110 or support structure 102. Where the intermediary bale holder 200 is provided as an add-on component such as part of a kit used to retrofit an existing bale processor 100, the intermediary bale holder 200 may further comprise a mounting frame for mechanically connecting the intermediary bale holder 200 to the frame 110 or support structure 102 of the bale processor. A mounting point 216 for repositioning a slow moving vehicle sign may be provided if the intermediary bale holder 200 blocks a location of the sign. The mounting frame may comprise one or multiple elements. For example, the mounting frame 210 may comprise one or more mounting brackets which, as depicted in FIG. 2, are mounted to a back section of the support structure 102 of the bale processor 100. The mounting frame 210 may be secured to the support structure 102 using bolts, for example. Additionally or alternatively, the intermediary bale holder 200 may be secured to the frame 110 or support structure 102 by welding of the mounting frame. Where the bale processor 100 is manufactured with the intermediary bale holder 200 (i.e., the intermediary bale holder 200 is not an add-on component), the mounting frame may be part of the frame 110 or support structure 102, or may be an additional component connected, either directly or indirectly, to the frame or support structure.

FIGS. 3A-C show detailed views of the intermediary bale holder 200. FIG. 3A shows an isometric view of the intermediary bale holder 200 from a rear side, similar to the view in FIG. 2; FIG. 3B shows an isometric view of the intermediary bale holder 200 from a front side; and FIG. 3C shows a front elevation view of the intermediary bale holder 200.

The intermediary bale holder 200 comprises the mounting frame 210, which is depicted in FIGS. 3A-3C as being formed from three separate mounting elements 210a, 210b, 210c, although different arrangements, including a unitary mounting frame are possible. Each of the mounting elements 210a-c may be formed from steel plate, tubing, pipe, bars, or other types of material. The mounting elements 210a-c may each comprise a pair of brackets with mounting holes for receiving bolts to secure the brackets to the bale processor. For example as depicted for mounting element 210a, the mounting element 210a comprises a first bracket 302a for connection to a rear section of the bale processor and a second bracket 302b for connection to another location of the bale processor such as to a support frame for the carrying forks, as depicted in FIG. 2. Although only labelled for the first mounting element 210a, the other mounting elements 210b, 210c may also have first and second brackets for securing different sides of the mounting elements to the bale processor. Further, although depicted as being provided by separate brackets, it is possible for the brackets to be formed as a single piece bracket connected to the bale processor.

As depicted, two of the mounting elements, namely mounting elements 210a, 210b support the holding arms 202a, 202b, and the third mounting element, namely 210c, supports a connection point for the actuation device 206. It will be appreciated that the specific arrangement and geometry of the mounting elements 210a, 210b, 210c may vary depending upon the particular layout of the intermediary bale holder 200. Further, although depicted as being mounted to the back section of the bale processor, it is possible that the mounting elements 210a-c may be secured to other structures of the bale processor.

The mounting elements 210a, 210b supporting the holding arms provide a pivotal connection for the holding arms. The pivotal connection may be provided by portions of round pipe on the brackets of the mounting elements. Each of the holding arms may have a corresponding round pipe section that allows a pivot pin to be inserted through the pipe sections of the brackets in order to pivotally support the holding arms. The pair of brackets of each mounting elements for the holding arms provides support for the pivotal connection on both sides of the mounting arm to provide a strong connection. Although not depicted in FIGS. 3A-C, bearing elements may be provided in order to reduce wear on the moving components. The particular shape and arrangement of the brackets of the mounting elements can adapted to fit different bale processors.

The third mounting element, namely 210c, provides the connection point for the actuation device 206. The connection point can be provided by a section of tubing or other similar structure that will not deform under the forces generated by the actuation device. The actuation device 206 is depicted as a hydraulic cylinder with one end pivotally connected to the section of tubing of the connection point. The other end of the hydraulic cylinder is pivotally connected to one of the holding arms. In particular, the hydraulic cylinder is pivotally connected to a trailing portion of one of the holding arms 202b. The trailing portion may extend from the holding arm from the pivotal connection and allow the actuator to be connected to the holding arm below the pivotal connection, or on an end of the holding arm that is located on an opposite side of the pivotal connection from the end section 204b. Accordingly, as the actuator is moved in or out, the end section 204 will move in an opposite direction. It will be appreciated that the actuator may be coupled to the holding arm on the other side of the connection point. Alternatively, other types of actuators may be used to move the holding arm. A single actuator is depicted in FIGS. 3A-C as controlling movement of both holding arms through a mechanical linkage, however it is possible for each of the arms to be coupled to a respective actuator.

The intermediary bale holder 200 depicted in FIGS. 3A-3C includes a mechanical linkage member 208 connected between the holding arms 202a, 202b. The mechanical linkage links movement of the holding arms such that both arms move using a single actuation device. The hydraulic cylinder may be connected to a first one of the holding arms, depicted in FIGS. 3A-3C as being connected to holding arm 202b, at a connection point below the pivot point. The linkage member 208 may be connected between the first and second holding arms 202a, 202b. The ends of the linkage member 208 are connected to respective holding arms. Each end of the linkage member 208 may be connected on opposite sides of the pivot point on each holding arm so that the arms move in opposition to each other and so move between the holding position and releasing position. For example, one end of the linkage member 208b is depicted as being coupled below the pivot point on one holding arm 202b and the other end of the linkage member 208a may be coupled above the pivot point on the other holding arm 202a. As depicted, each end of the linkage member 208 may be coupled to the respective holding arm by respective connecting lever members 304a, 304b. The actuator 206 may also be coupled to one of the connecting lever members, depicted as connecting lever member 304b. Accordingly, by actuation of the actuation device, both holding arms 202a, 202b, and hence ends 204a, 204b of the holding arms 202a, 202b, may be moved in synchronization with each other due to the linkage member 208. In this manner, the pressure that is applied to the bale being supported by the end sections of the holding arms 204a, 204b is the same. In the configuration depicted in FIGS. 3A-C, the holding arms 202a, 202b are rotated about the respective pivotal connections that provide a horizontal axis that is generally parallel to the longitudinal axis of the bale processor.

An intermediary bale holder 200 comprising the actuation device 206 and the linkage member 208 arranged as shown in FIGS. 3A-C represents just one type of implementation that may be used to controllably move the holding arms 202a, 202b. A person skilled in the art will readily appreciate other types of actuation devices and mechanical linkages that could achieve the same result without departing from the scope of this disclosure. For example, a pneumatic cylinder could be used instead of a hydraulic cylinder. Moreover, instead of only one hydraulic/pneumatic cylinder with a linkage member connecting the two holding arms 202a, 202b, each holding arm may be respectively connected to a hydraulic/pneumatic cylinder. Further still, the actuation device may instead comprise a pair of rotational actuators such as motors or stepper motors. Additionally, movement of the one arm may be linked to the second arm by a different type of mechanical linkage, for example through gears and/or belts.

The actuation device 206 may have control lines 212 for allowing the operator to control the actuation device 206 so as to controllably move the holding arms 202a, 202b. For example, the control lines 212, which are omitted from FIGS. 3B, 3C for clarity and simplicity, may provide the hydraulic fluid used to actuate the hydraulic cylinder. The control lines 212 may be connected to or be a part of the control lines 106 depicted in FIG. 1, or may be distinct therefrom.

As depicted in FIGS. 3A-3C, the ends 204a, 204b of the holding arms 202a, 202b may comprise a plurality of teeth 214 for better gripping a bale being supported by the intermediary bale holder. The ends 204a, 204b may also be provided without any gripping means, and thus support the bale simply by the squeezing force applied via the ends 204a, 204b. Further, as the holding ends 204a, 204b are depicted as being provided by a pair of parallel members each with respective gripping teeth, however the holding ends 204a, 204 may be provided in various other arrangements including for example as a single bar or pipe.

Figure 4:
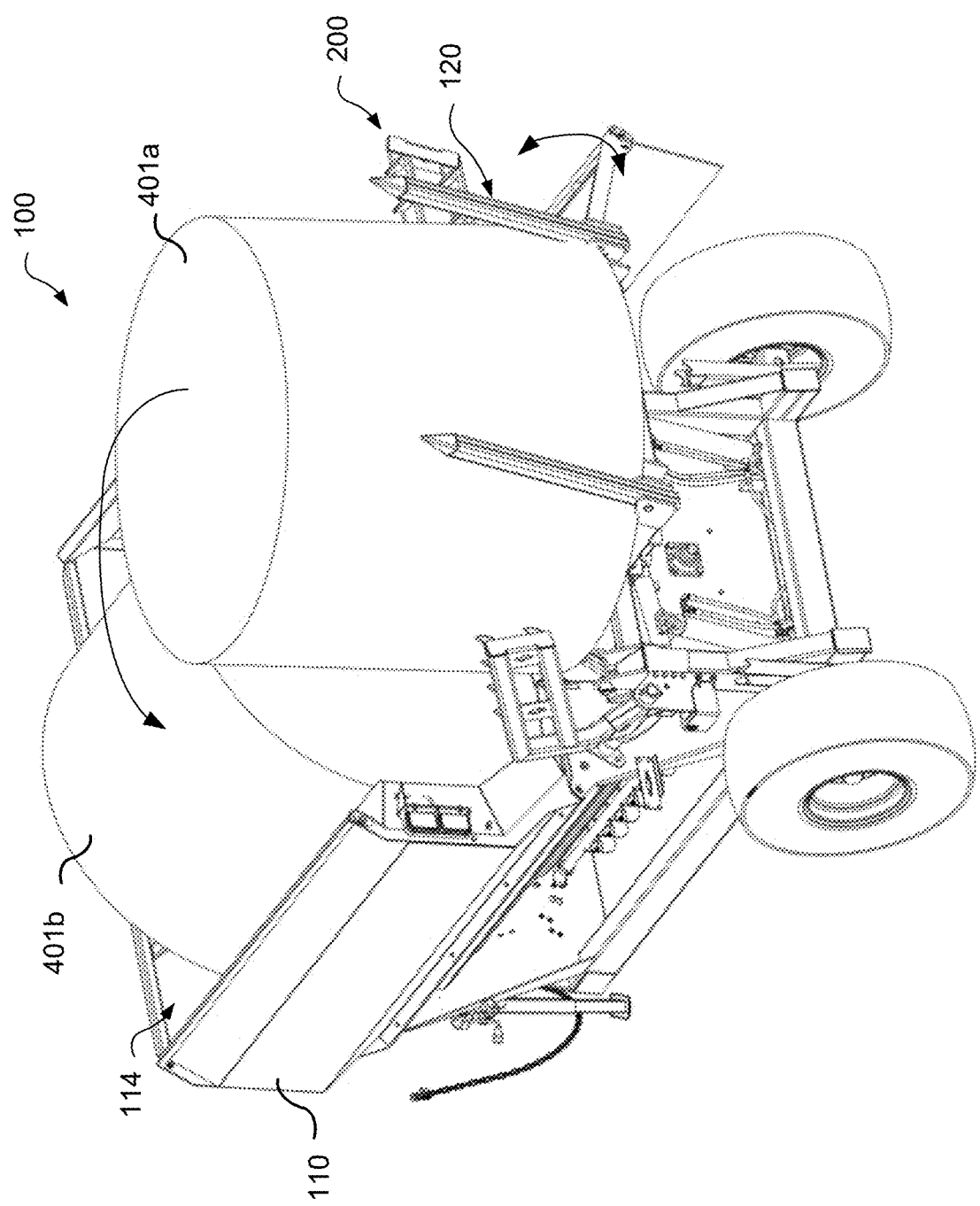
FIG. 4 shows a representation of a bale being loaded into a disintegration housing of the frame of the bale processor.

FIG. 4 shows a representation of a bale being loaded into a disintegration housing 114 of the frame 110 of the bale processor 100. In accordance with the bale processor 100 with the intermediary bale holder 200 as described herein, there are several manners in which a bale may loaded into the disintegration housing 114, which will be described with reference to FIG. 4.

A bale may be supported in a first position 401a by the bale carrier 120 and may be loaded directly from the bale carrier 120 into the disintegration housing 114, depicted as location 401b, when there is no bale supported by the intermediary bale holder 200. As previously described, the bale carrier 120 is moveably coupled to a back section of the support structure 102 or frame 110 and is moveable between a transport position and a delivery position. In the transport position, the bale carrier 120 is capable of supporting the bale above the ground. The bale carrier 120 is able to move to the delivery position to deliver the bale to the disintegration housing 114 above the disintegration rotor depicted as bale position 401b. When a bale is not supported by the intermediary bale holder 200, the holding arms 202a, 202b of the bale holder may be moved to the releasing position so as not to interfere with the delivery of the bale or the movement of the bale carrier 120. The bale carrier 120 is controlled to move from the transport position to the delivery position, thereby lifting the bale from bale position 401a up and delivering the bale into the disintegration housing 114 in position 401b.

Although depicted as moving a bale supported on the bale carrier 120 from a first position 401a to a second position 401b in the disintegration housing 114, the bale carriers may also be used to deposit a bale held by the intermediary carrier into the disintegration housing. If there is no bale on the bale carrier, the bale carrier 120 may be moved from the transport position to the delivery position. As the bale carrier 120 makes contact with the bale held by the intermediary bale holder, the holding arms 202a, 202b of the intermediary bale holder 200 may be moved from a holding position for supporting the bale to a releasing position. The bale carrier 120 continues moving to the delivery position supporting the bale thereon that was released from the intermediary bale holder. The bale is lifted up and delivered into the disintegration housing 114.

Similarly, a bale that is supported by the intermediary bale holder 200 may be loaded into the disintegration housing 114 using the bale carrier 120 when a bale is supported by the bale carrier. The intermediary bale holder 200 may be supporting the bale with the holding arms 202a, 202b arranged in the holding position. The bale carrier 120 may be supporting a bale in the transport position. To load the bale supported by the intermediary bale holder 200 into the disintegration housing 114, the bale carrier 120 may be moved from the transport position towards the delivery position. As the bale carrier 120 is moved toward the delivery position, the bale supported by the bale carrier 120 contacts the bale supported by the intermediary bale holder 200. The holding arms 202a, 202b of the intermediary bale holder 200 may be moved from the holding position for supporting the bale to the releasing position, and the bale supported by the bale carrier 120 pushes the bale into the disintegration housing 114 as the bale carrier is moved further towards the transfer position. The bale 101b is delivered into the disintegration housing 114 without the bale carrier 120 having fully reached the delivery position.

The intermediary bale holder 200 thus extends the bale-carrying capacity of the bale processor 100 without requiring the overall length of the bale processor 100 to be extended. The intermediary bale holder 200 is capable of supporting a third bale in an intermediary position between a first bale supported in the disintegration housing 114 above the disintegration rotor 112 and a second bale supported by the bale carrier 120 in the transport position. Movement of bales between the bale carrier 120, intermediary bale holder 200, and the disintegration housing 114 is easily facilitated and can be remotely controlled by an operator. Moreover, the intermediary bale holder 200 does not interfere with movement of the bale carrier 120. Several advantages may therefore be obtained with the bale processor comprising the intermediary bale holder 200 or with a bale processor being retrofitted with a kit comprising the intermediary bale holder 200.

FIGS. 5 thru 10 show various bale-carrying configurations of the bale processor 100. As has been previously described, the bale processor 100 comprising the intermediary bale holder 200 can provide for additional bale-carrying capacity and additional bale-carrying configurations.

Figure 5:
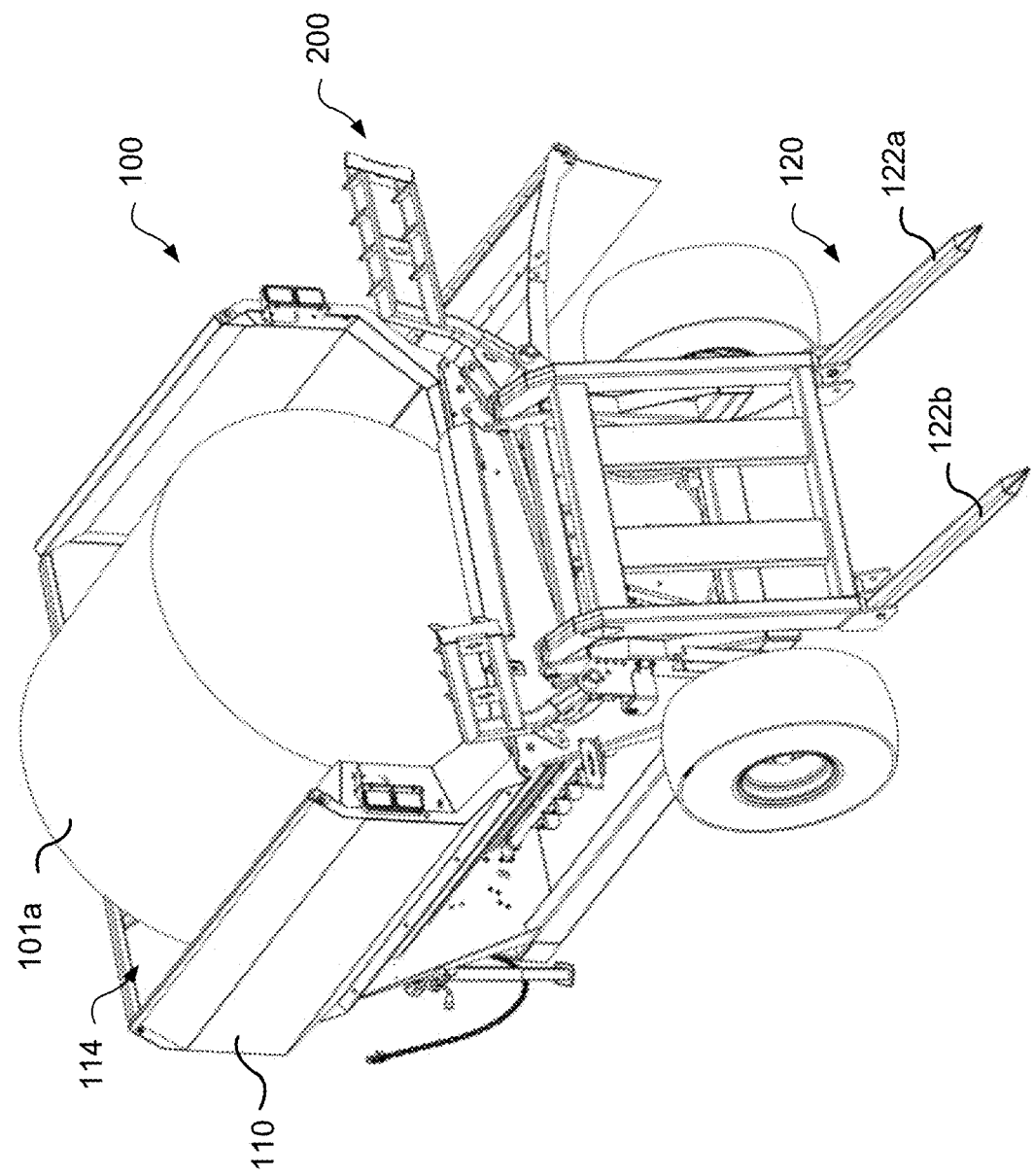
FIG. 5 shows a first bale-carrying configuration of the bale processor.

FIG. 5 shows a first bale-carrying configuration of the bale processor 100. The bale processor 100 comprises a first bale 101a supported in the disintegration housing 114 of the frame 110. The bale carrier 120 may be arranged in the loading or transport position (though during transport, the bale carrier 120 would be in the transport position). The holding arms of the intermediary bale holder 200 are in the releasing position.

Figure 6:
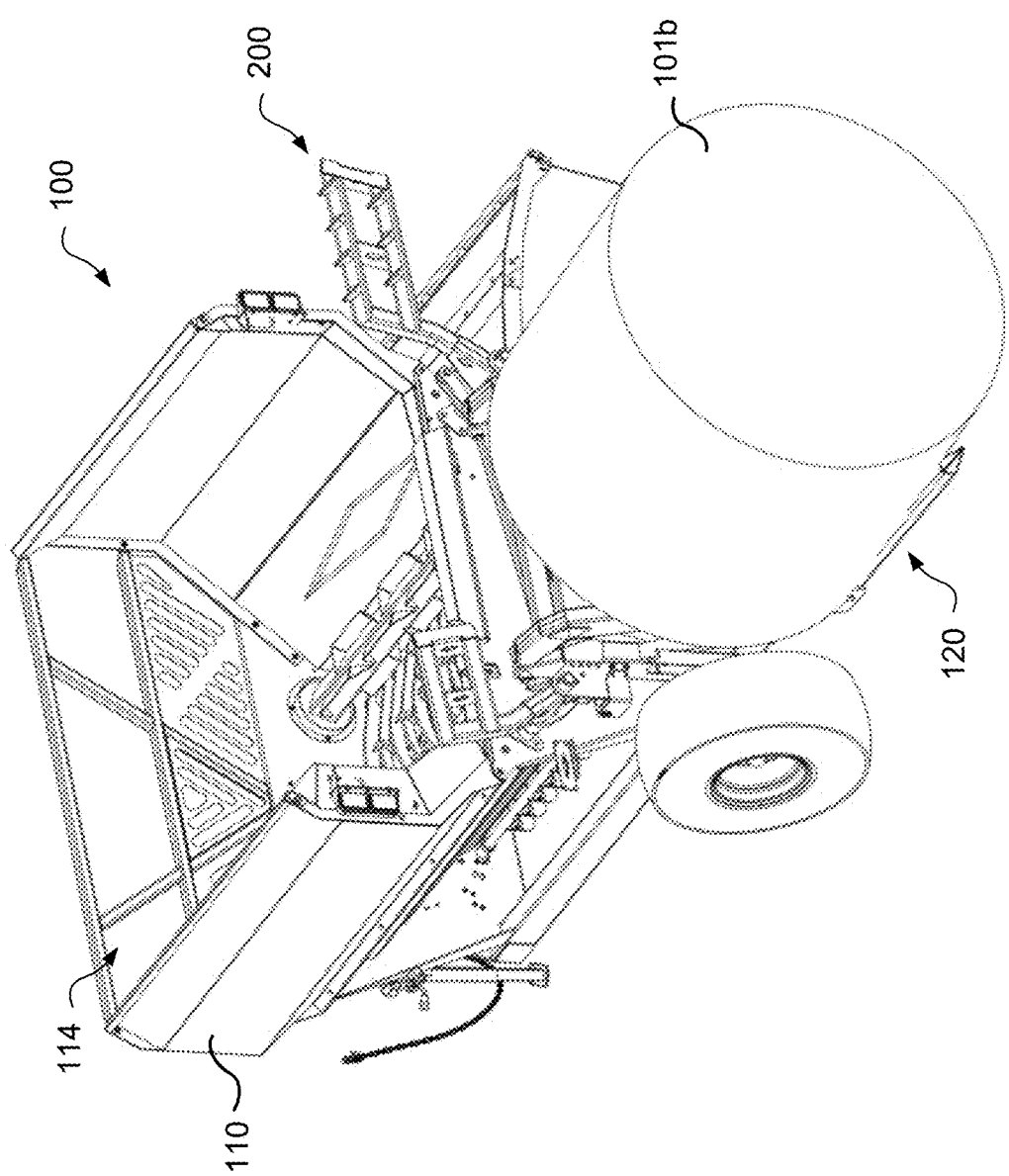
FIG. 6 shows a second bale-carrying configuration of the bale processor.

FIG. 6 shows a second bale-carrying configuration of the bale processor 100. The bale processor 100 comprises a bale 101b supported by the bale carrier 120. The bale carrier 120 is in the transport position. The holding arms of the intermediary bale holder 200 are in the releasing position.

Figure 7:
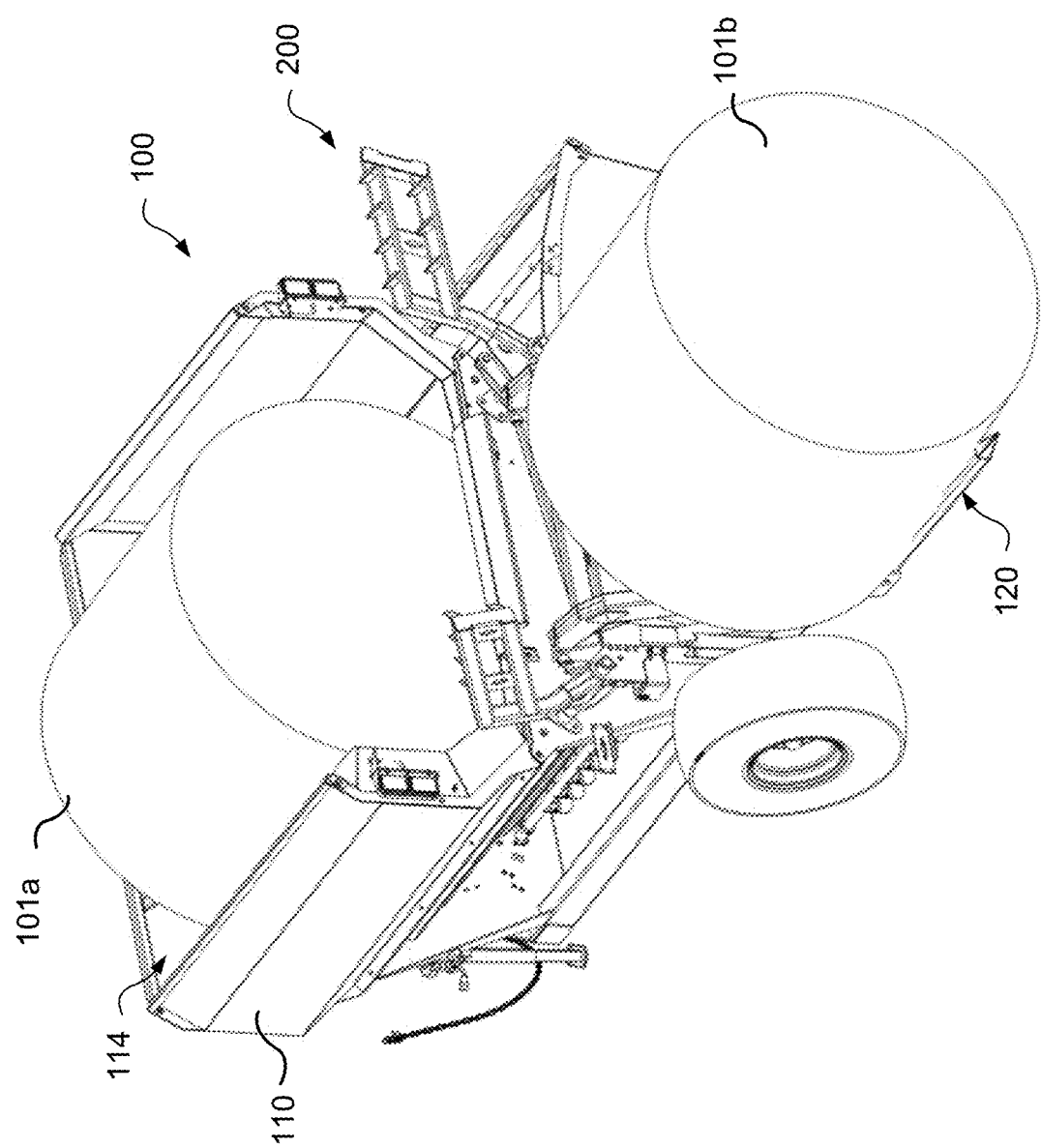
FIG. 7 shows a third bale-carrying configuration of the bale processor.

FIG. 7 shows a third bale-carrying configuration of the bale processor 100. The bale processor 100 comprises a first bale 101a supported in the disintegration housing 114 of the frame 110, as well as a second bale 101b supported by the bale carrier 120. The bale carrier 120 is in the transport position. The holding arms of the intermediary bale holder 200 are in the releasing position.

Figure 8:
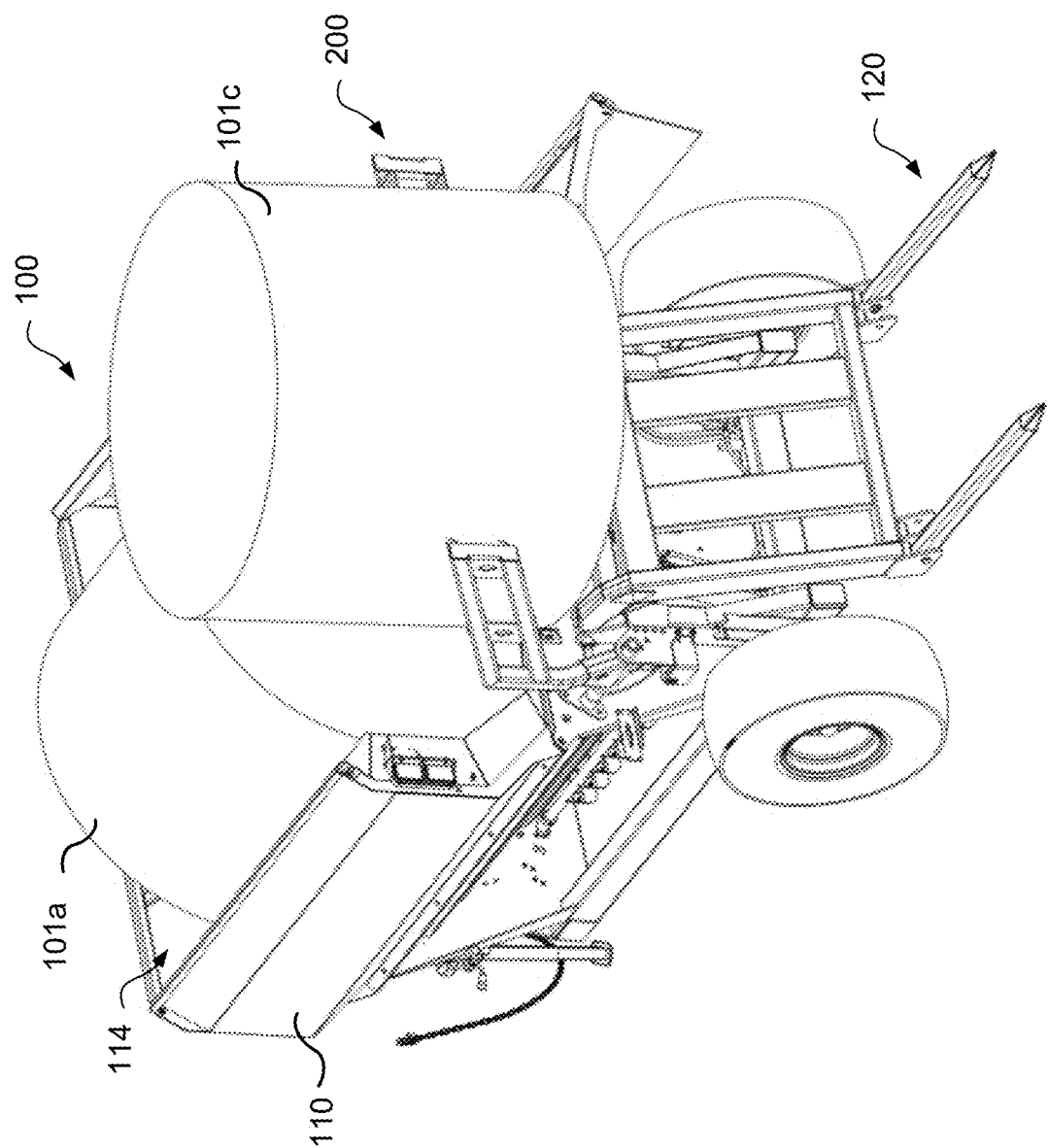
FIG. 8 shows a fourth bale-carrying configuration of the bale processor.

FIG. 8 shows a fourth bale-carrying configuration of the bale processor 100. The bale processor 100 comprises a first bale 101a supported in the disintegration housing 114 of the frame 110, as well as another bale 101c supported by the intermediary bale holder 200. The bale carrier 120 is in the transport position. The holding arms of the intermediary bale holder 200 are in the holding position.

Figure 9:
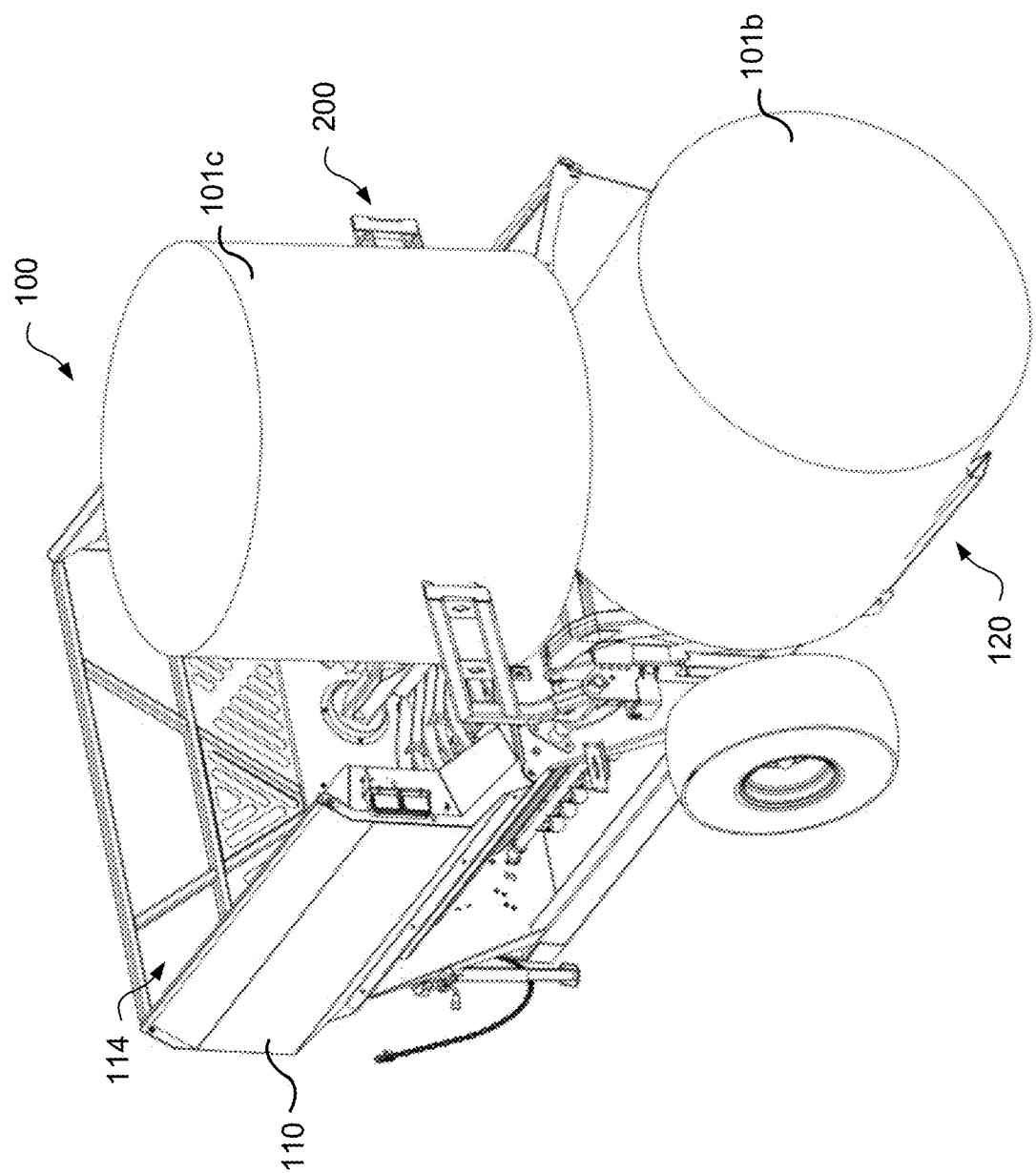
FIG. 9 shows a fifth bale-carrying configuration of the bale processor.

FIG. 9 shows a fifth bale-carrying configuration of the bale processor 100. The bale processor 100 comprises a bale 101b supported by the bale carrier 120, as well as a second bale 101c supported by the intermediary bale holder 200. The bale carrier 120 is in the transport position. The holding arms of the intermediary bale holder 200 are in the holding position.

FIG. 10 shows a sixth bale-carrying configuration of the bale processor 100. The bale processor 100 comprises a first bale 101a supported in the disintegration housing 114 of the frame 110, a second bale 101b supported by the bale carrier 120, as well as a third bale 101c supported by the intermediary bale holder 200. The bale carrier 120 is in the transport position. The holding arms of the intermediary bale holder 200 are in the holding position.

Loading the three bales 101a-c onto the bale processor 100 in accordance with the sixth bale-carrying configuration may be performed as follows. The bale carrier 120 is moved to the loading position and the first bale 101a is loaded onto the bale carrier 120. The bale carrier 120 is moved to the delivery position and the first bale 101a is delivered to the disintegration housing 114. The bale carrier 120 is then moved back to the loading position and the next bale 101b is loaded onto the bale carrier 120. The bale carrier 120 is moved to the transfer position and the bale 101b is supported by the intermediary bale holder 200 by moving the holding arms of the intermediary bale holder 200 to the holding position. The bale carrier 120 is then moved back to the loading position and the next bale 101c is loaded onto the bale carrier 120. The bale carrier 120 is moved to the transport position.

Figure 11:
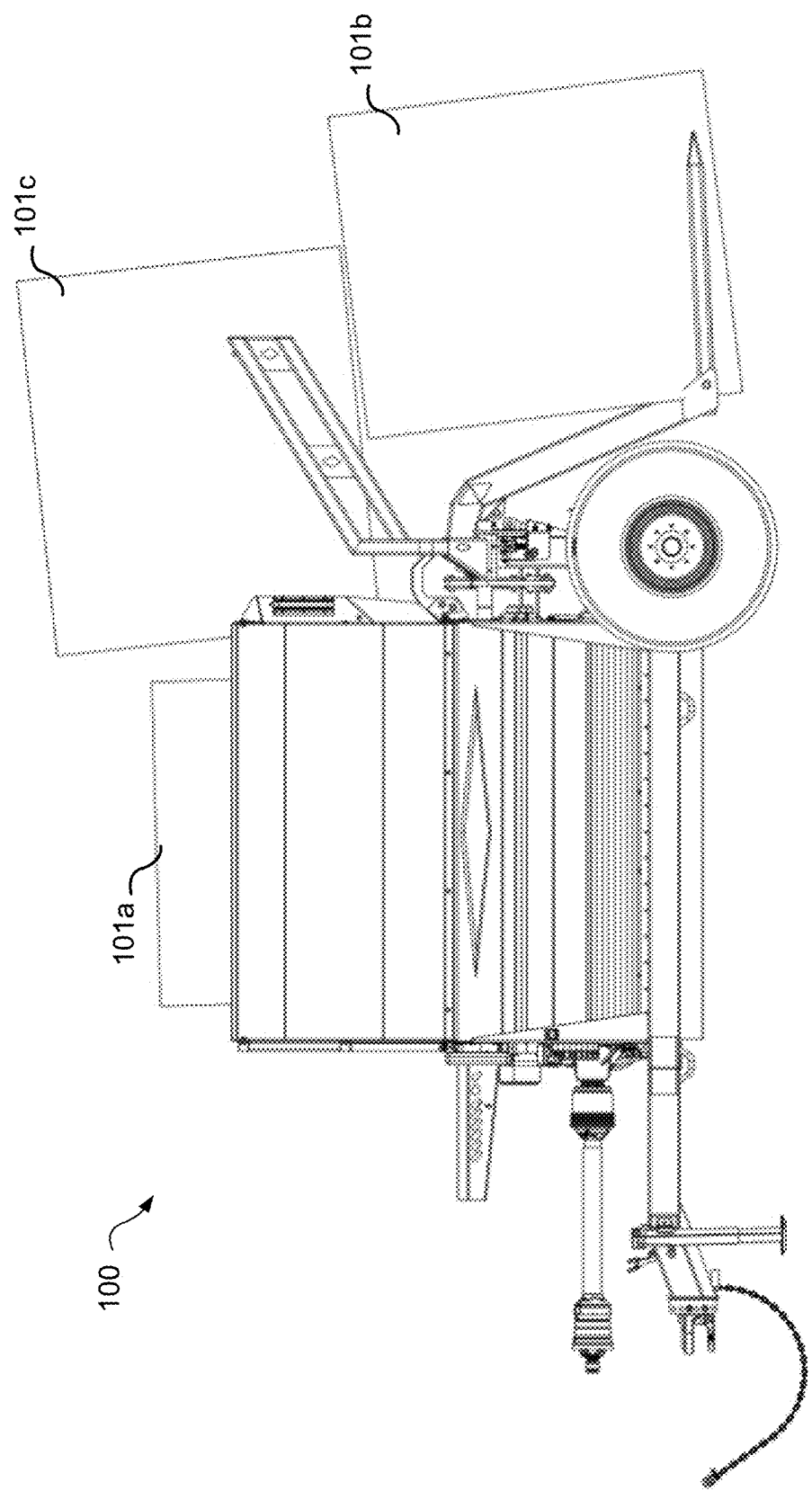
FIG. 11 shows a side view of the bale processor supporting three bales.

FIG. 11 shows a side view of the bale processor 100 supporting the three bales 101a-c. The intermediary bale holder is capable of supporting the bale 101c in an intermediary position between the bale 101a above the disintegration rotor and the bale 101b supported by the bale carrier in the transport position. The transport position of the bale carrier may be such that the top surface of the bale 101b is in contact with the bottom surface of the bale 101c, thereby providing additional support for the intermediary bale holder to hold the bale 101c.

Figure 12:
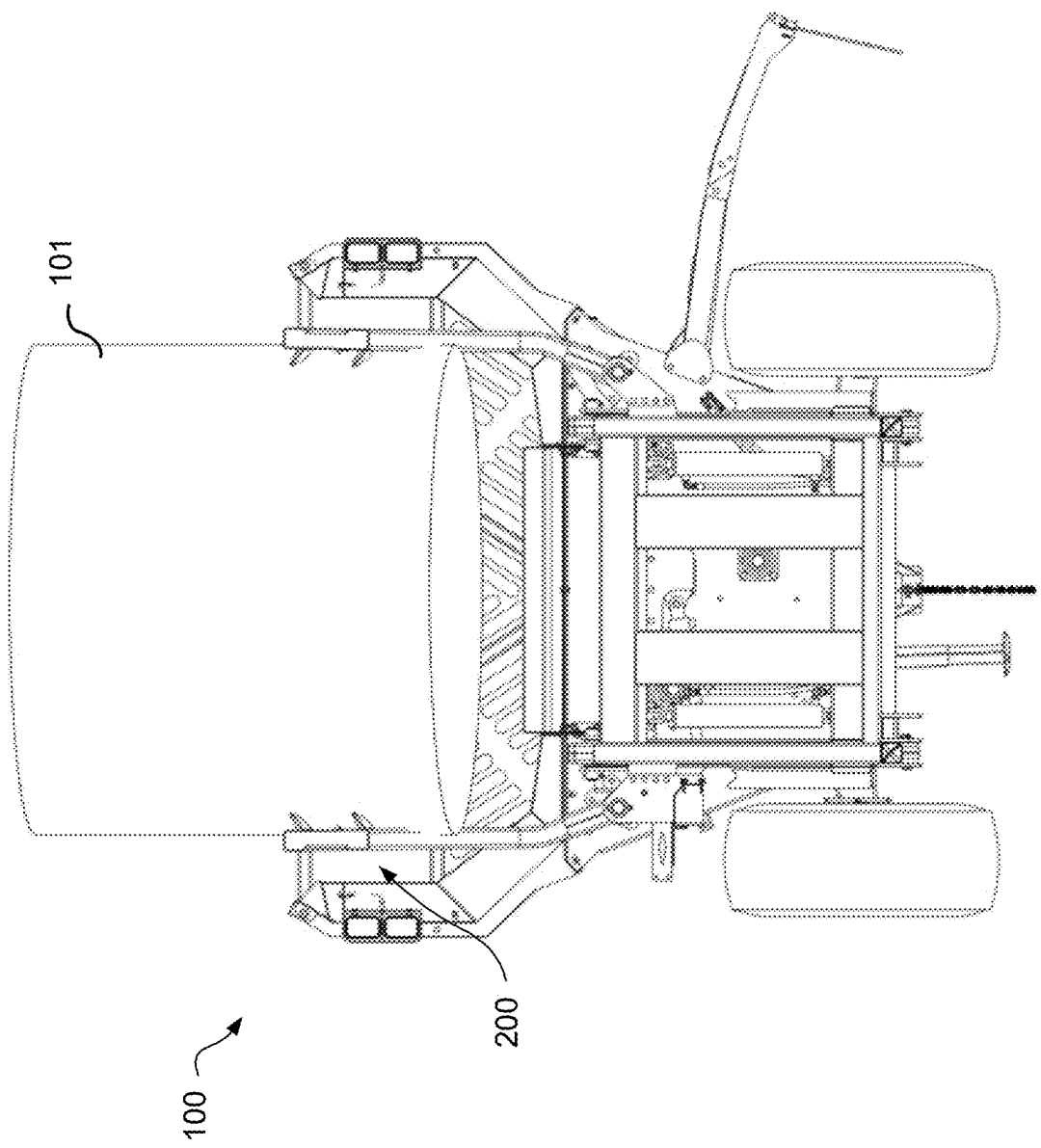
FIG. 12 shows a rear view of the bale processor with the intermediary bale holder supporting a bale.

FIG. 12 shows a rear view of the bale processor 100 with the intermediary bale holder 200 supporting a bale 101. In addition to the bale-carrying configurations described above, there is still a further bale-carrying configuration with the bale processor carrying just a single bale supported by the intermediary bale holder 200.

As described above, when transporting bales using the bale processor as disclosed herein, the operator may lift a first bale using a bale carrier, which may for example be provided as a pair of carrying forks, all the way until the bale is placed in a disintegration housing, also referred to as a tub, defined at least in part by the frame of the bale processor. When positioned within the disintegration housing, a bale is supported above a bale disintegration rotor. The bale carrier may be mechanically coupled, directly or indirectly, to the frame at a back section of the frame and moveable between various positions including a loading position, a transport position, a transfer position, and a delivery position. The loading position facilitates loading of a bale onto the bale carrier; the transport position supports a bale above a ground surface for transportation; the transfer position transfers a bale from the bale carrier to the intermediary bale holder; and the delivery position delivers a bale, whether held by the intermediary bale holder or the bale carrier, to the disintegration housing above the disintegration rotor. A second bale can be loaded onto and supported by the bale carrier which can be moved to the transfer position. Then, the holding arm(s) of the intermediary bale holder may be actuated to support the bale in the holding position. The second bale will be held in place by the intermediary bale holder during loading of a third bale on the bale carrier and transport to the processing area. Once the second bale is held in place, the bale carrier may be lowered down to the loading position and the third bale is loaded onto the bale carrier. The third bale may be lifted using the bale carrier to the transport position. In some embodiments, the transport position of the bale carrier may be such that a top of the bale that is being held by the bale carrier in the transport position presses into the second bale being supported by the intermediary bale holder to provide additional support for holding the second bale during transport.

At the processing location, the first bale may be processed by rotation of the disintegration rotor. Once the first bale has been sufficiently disintegrated by the disintegration rotor, the second bale held by the intermediary bale holder may be loaded into the disintegration housing of the bale processor. Loading of the second bale held by the intermediary bale holder can be performed by lifting the bale carrier which causes the third bale to push the second bale held by the intermediary bale holder upwards and forwards into the disintegration housing. As the bale carrier is lifted, the holding arm(s) of the intermediary bale holder may be actuated to an open or releasing position to allow the second bale to be deposited into the disintegration housing of the bale processor. With the second bale loaded into the disintegration housing, the third bale may remain supported by the bale carrier or transferred to the intermediary bale holder. The third bale may be subsequently delivered to the disintegration housing once the second bale has been sufficiently disintegrated by the disintegration rotor.

Furthermore, even when the bale processor comprises the intermediary bale holder the bale processor may still be used as a standard two bale machine without interference from intermediary bale holder. The holding arm(s) of the intermediary bale holder may be actuated to an open position or releasing position so as not to interfere with the bale carrier as it delivers the bale to the disintegration housing.

Figure 13:
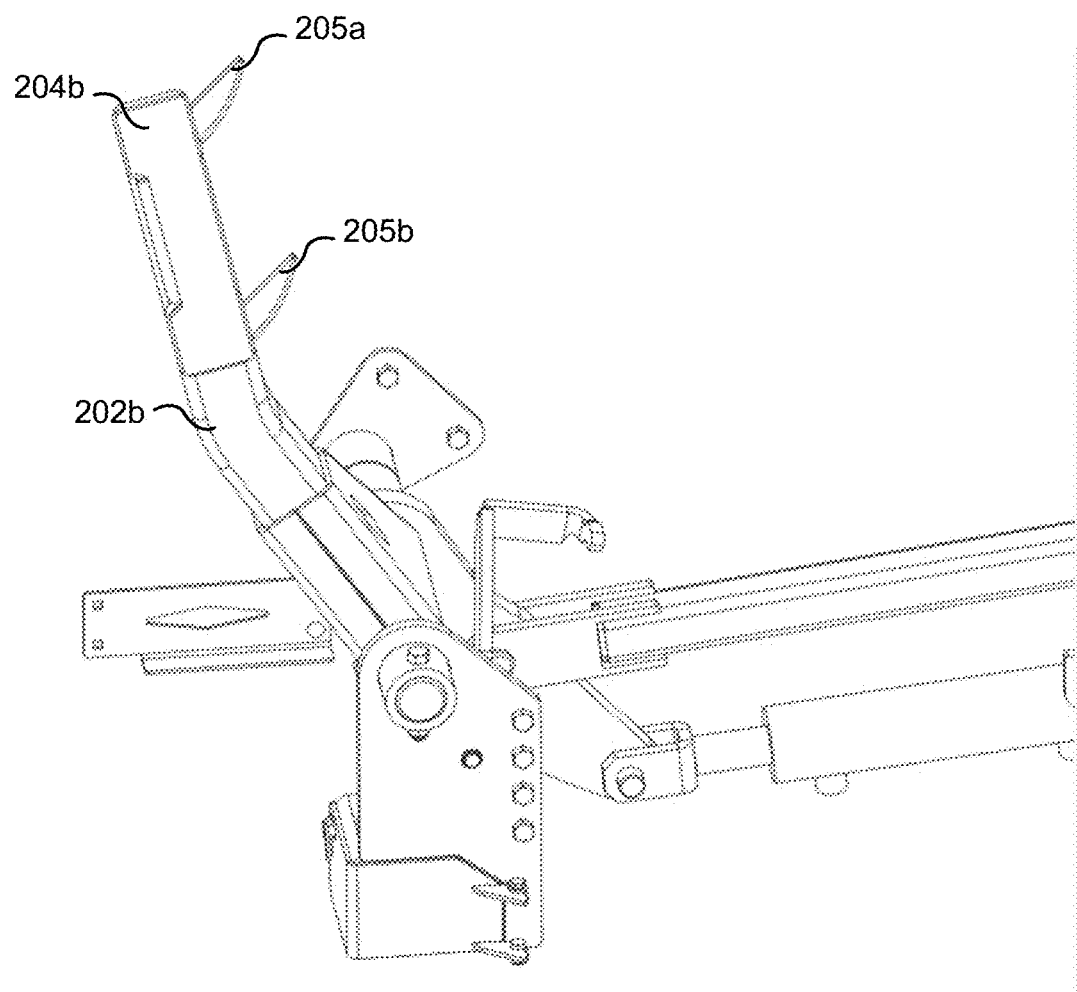
FIG. 13 shows a detail of gripping teeth provided on an end of a holding arm of the intermediary bale holder

FIG. 13 shows a detail of gripping teeth provided on an end of a holding arm of the intermediary bale holder 200. Each end 204a, 204b of the holding arms 202a, 202b may be provided with gripping means for better gripping a bale that is held by the intermediary bale holder 200. Alternatively, only one end 204a or 204b may be provided with gripping means. The gripping means may comprise a plurality of teeth 205a-b that can penetrate into the bale being supported by the intermediary bale holder. The teeth 205a-b may, for example, be provided in one or more rows or dispersed throughout the surface of the end(s) 204a, 204b.

The gripping teeth 205a-b may be pitched upwards to help increase the clamping pressure on the bale as the bale settles into the grips as the bale carrier 120 is lowered. In some embodiments, it may be preferable for the teeth 205a-b to be pitched upward at an angle of between 45-75 degrees from horizontal when the holding arms 202a, 202b are in the holding position, more preferably at an angle of approximately 60 degrees.

The intermediary bale holder was described above as using a pair of holding arms movable in a horizontal direction perpendicular to a longitudinal axis of the bale processor 100. It will be appreciated that other mechanisms may be provided for holding the additional bale in position. For example, instead of the arms moving by rotation, the pair of arms may slide in and out on linear bearings, and/or a single arm may move to contact a stationary arm. Other types of movements are possible as described below with reference to FIGS. 14 and 15.

Figure 14:
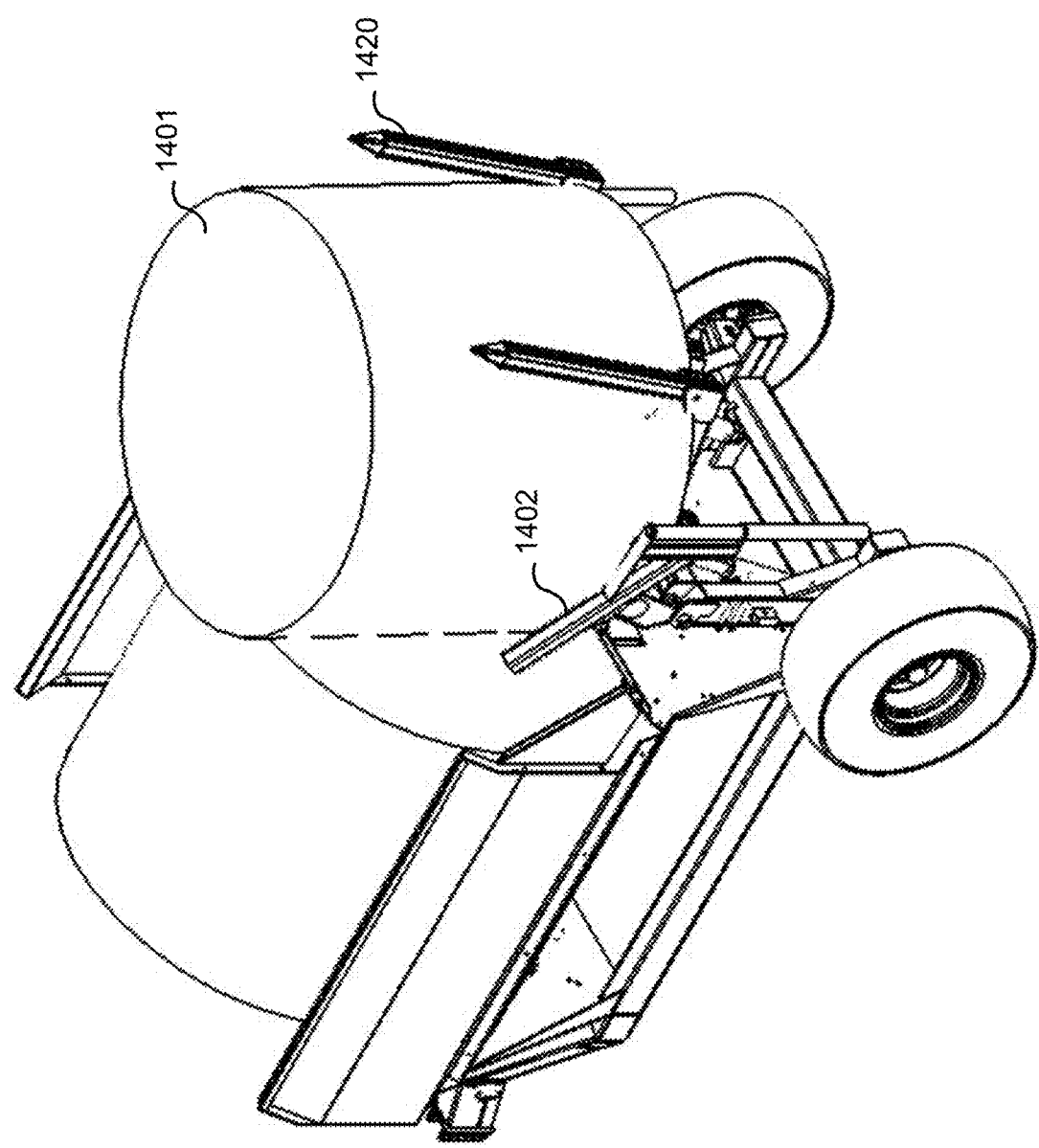
FIG. 14 shows an alternative embodiment of an intermediary bale holder.

FIG. 14 shows an alternative embodiment of an intermediary bale holder. The intermediary bale holder depicted in FIG. 14 is similar to that described above; however, rather than the holding arms rotating about a horizontal axis parallel to the longitudinal axis, the pair of holding arms 1402 rotate about a vertical pivotal axis that is perpendicular to the longitudinal axis of the bale processor. The bale carrier 1420 may raise a bale 1401 into the intermediary position and the pair of holding arms may be rotated about the vertical axis in order to squeeze and support the bale in the intermediary position to allow the bale carrier to be moved to pick up another bale. Alternatively, one of the holding arms may be moved by an actuator to squeeze the bale against a stationary arm.

Figure 15:
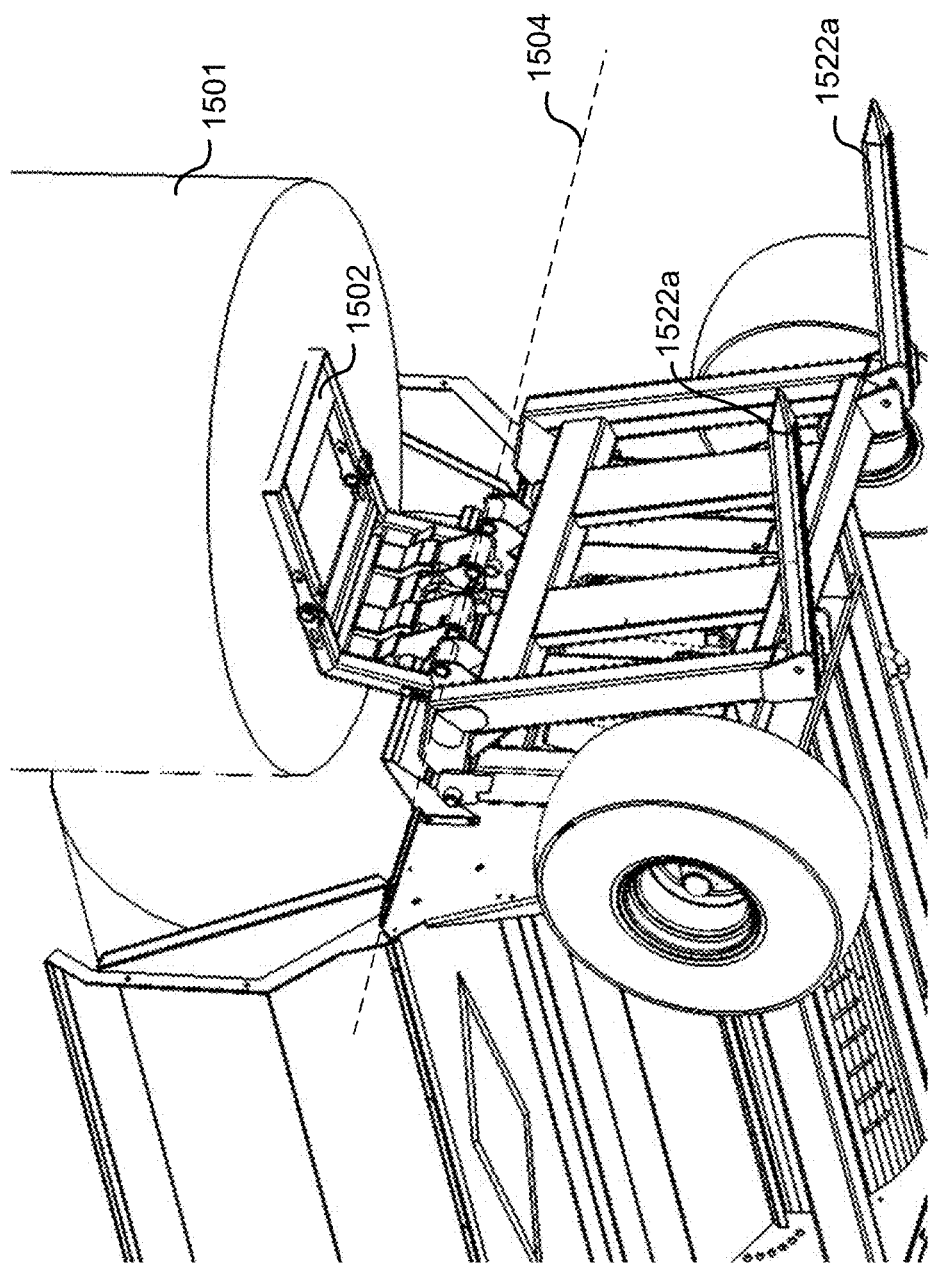
FIG. 15 shows a further embodiment of an intermediary bale holder.

FIG. 15 shows a further embodiment of an intermediary bale holder. The intermediary bale holder 1502 depicted in FIG. 15 is similar to those described above; however, rather than using a pair of holding arms to squeeze and support the bale in the intermediary position, the intermediary bale holder of FIG. 15 utilizes a single holding arm 1502 that can be rotated under the bale 1501 to support the bale in the intermediary position. As depicted, the holding arm 1502 of the intermediary bale holder may be widened to provide a larger support base. The holding arm 1502 may rotate under the bale 1501 to provide support as depicted in FIG. 15. The holding arm of the intermediary bale holder 1502 rotates about a horizontal axis 1504 that is perpendicular to the longitudinal axis of the bale processor. The holding arm 1502 is sized to fit between the forks 1522a-b of the bale carrier. The holding arm 1502 may be rotated down to lie against a back of the bale carrier, which allows the bale carrier to pick up an additional bale. As the bale carrier is rotated upwards to lift the bale 1501, the holding arm may move with the bale carrier. Once the bale 1501 is lifted into the intermediary position, the holding arm may be held in position, by an actuator or locking mechanism, to support the bale in an intermediary position while the bale carrier is lowered in order to pick up another bale. When depositing a bale from the bale carrier, the holding arm may be rotated further forward, either by an actuator or by the bale pushing the holding arm, to a position that allows the bale to be deposited from the bale carrier to the disintegration housing. Alternatively, the holding arm may comprise a linkage that allows the arm to retracted and fold onto itself to allow passage of the third bale.

It will be appreciated by one of ordinary skill in the art that the system and components shown in FIGS. 1-15 may include components not shown in the drawings. For simplicity and clarity of the illustration, elements in the figures may not necessarily be shown to scale, are only schematic and are non-limiting of the elements structures.

Although various embodiments of an intermediary bale holder have been described above, it will be appreciated that further embodiments are possible that support an additional bale in an intermediary position. While the intermediary bale holder described above may be particularly well suited for use in extending bale carrying capacity of a bale processor without extending an overall length of the bale processor, it will be appreciated that the intermediary bale holder may also be beneficial to further extend bale carrying capacity where the overall length may be extended, such as by providing a long bale processor or using a bale carrying trailer. Further, the intermediary bale holder may be manufactured as part of a bale processor, or may be provided as a standalone component that can be retrofitted to existing bale processors. Further, the intermediary bale holder may be provided as an additional accessory or option on new bale processors. The intermediary bale holder may be provided as a kit including the intermediary bale holder along with mounting hardware such as mounting plates, nuts and bolts, control lines used for mounting the intermediary bale holder to a bale processor, etc.

The bale processor as described herein may be used for various types of bales, including hay bales, straw bales, etc., and for various shapes of bales including square bales, rectangular bales, round bales, etc. The bale processor as described herein may also be used in association with various tow vehicles or locomotives, including tractors, trucks, etc. The intermediary bale holder as described herein may be retrofitted on various types of bale processors, including bale processors that may not have all of the features of the bale processor as described herein. It will be apparent to persons skilled in the art that a number of variations and modifications can be made without departing from the scope of the invention as described herein.

Although certain components have been described, it is contemplated that individually described components may be combined together into fewer components. Similarly, individual components may be provided by a plurality of components. One of ordinary skill in the art having regard to the current teachings will appreciate that the components described herein may be provided by various combinations of components, other than the specific implementations described herein as illustrative examples. Numerous additional variations on the apparatus of the various embodiments described above will be apparent to those skilled in the art in view of the above description. Such variations are to be considered within the teachings of the current description.

What is claimed is:

1. A bale processor comprising:
   a frame supporting a bale disintegration rotor, the frame sized to support a first bale in a disintegration housing above the disintegration rotor;
   a bale carrier moveably coupled to the frame at a back section of the frame and moveable between a transport position and a delivery position, the transport position capable of supporting a second bale above a ground surface and the delivery position capable of delivering the second bale supported on the bale carrier to the disintegration housing;
   a holding arm moveably coupled to the back section of the frame; and
   an actuation device coupled to the holding arm for controllably positioning the holding arm between at least two positions comprising:
      a holding position supporting a third bale, when in use, in an intermediary position between the first bale supported in the disintegration housing above the disintegration rotor of the bale processor and the second bale supported on the bale carrier, allowing the bale carrier to move to the transport position and support a second bale above the ground surface thereby extending a bale-carrying capacity of the bale processor; and
      a releasing position releasing the third bale.

2. The bale processor of claim 1, further comprising a second holding arm, wherein the holding arm and the second holding arm are arranged at opposite sides of the third bale.

3. The bale processor of claim 2, wherein the holding arm and second holding arm are each coupled to the frame at a respective pivotal connection and are pivotable about a horizontal axis that is parallel to a longitudinal axis of the bale processor.

4. The bale processor of claim 3, further comprising a mechanical linkage connecting the holding arm and the second holding arm to move the holding arm and second holding arm between the holding position and the releasing position using the actuation device.

5. The bale processor of claim 4, wherein the mechanical linkage is coupled to one of the holding arm and second holding arm above the respective pivotal connection and is coupled to the other one of the holding arm and second holding arm below the respective pivotal connection.

6. The bale processor of claim 3, wherein the actuation device is further coupled with the second holding arm and configured to move the second holding arm relative to the frame of the bale processor.

7. The bale processor of claim 3, further comprising a second actuation coupled with the second holding arm and configured to move the second holding arm relative to the frame of the bale processor.

8. The bale processor of claim 2, wherein an end of the holding arm is configured to move towards and away from an end of the second holding arm.

9. The bale processor of claim 2, wherein at least one of the holding arm and the second holding arm is pivotable about a vertical axis that is perpendicular to a longitudinal axis of the bale processor.

10. The bale processor of claim 1, wherein the holding arm comprises a plurality of bale gripping teeth pitched at an angle of between 45 and 75 degrees from the holding arm.

11. The bale processor of claim 1, wherein the holding arm is pivotable about a horizontal axis that is perpendicular to a longitudinal axis of the bale processor.

12. The bale processor of claim 11, wherein the holding arm provides an extended platform supporting a bottom of the third bale when in the holding position.

13. The bale processor of claim 1, wherein the bale processor further comprises a member for mechanical connection to a tow vehicle, and wherein the bale processor further comprises control lines for connection to the tow vehicle, the control lines coupled with the bale disintegration rotor, the bale carrier, and the intermediary bale holder to allow control thereof.

14. An intermediary bale holder for mounting to a bale processor having a disintegration housing supporting a first bale and a bale carrier moveable between a transport position capable of supporting a second bale above a ground surface and a delivery position capable of delivering the second bale supported on the bale carrier to the disintegration housing of the bale processor, intermediary bale holder comprising:
   a mounting frame mountable to the bale processor; and
   a holding arm moveably coupled to the mounting frame, the holding arm positionable between at least two positions comprising:
      a holding position supporting a third bale, when the intermediary bale holder is mounted to the bale processor and in use, in an intermediary position between the first bale supported in the disintegration housing above the disintegration rotor of the bale processor and the second bale supported on the bale carrier, allowing the bale carrier to move to the transport position and support a second bale above the ground surface thereby extending a bale-carrying capacity of the bale processor, and
      a releasing position releasing the bale.

15. The intermediary bale holder of claim 14, further comprising an actuation device coupled to the holding arm and controllable to position the arm between the holding position and the releasing position.

16. The intermediary bale holder of claim 15, further comprising a second holding arm, wherein the holding arm and the second holding arm are arranged at opposite sides of the third bale when the intermediary bale holder is mounted to the bale processor and is supporting the third bale.

17. The intermediary bale holder of claim 16, wherein the holding arm and second holding arm are each coupled to the mounting frame at a respective pivotal connection and are pivotable about a horizontal axis that is parallel to a longitudinal axis of the bale processor.

18. The intermediary bale holder of claim 17, wherein the intermediary bale holder further comprises a mechanical linkage connecting the holding arm and the second holding arm to move the holding arm and second holding arm between the holding position and the releasing position using the actuation device.

19. The intermediary bale holder of claim 18, wherein the mechanical linkage is coupled to one of the holding arm and second holding arm above the respective pivotal connection and is coupled to the other one of the holding arm and second holding arm below the respective pivotal connection.

20. The intermediary bale holder of claim 17, wherein the actuation device is further coupled with the second holding arm and configured to move the second holding arm relative to the frame of the bale processor.

21. The intermediary bale holder of claim 17, further comprising a second actuation coupled with the second holding arm and configured to move the second holding arm relative to the frame of the bale processor.

22. The intermediary bale holder of claim 16, wherein an end of the holding arm is configured to move towards and away from an end of the second holding arm.

23. The intermediary bale holder of claim 16, wherein at least one of the holding arm and the second holding arm is pivotable about a vertical axis that is perpendicular to a longitudinal axis of the bale processor.

24. The intermediary bale holder of claim 16, wherein the holding arm is pivotable about a horizontal axis that is perpendicular to a longitudinal axis of the bale processor.

25. The intermediary bale holder of claim 24, wherein the holding arm provides an extended platform supporting a bottom of the third bale when in the holding position.

26. The intermediary bale holder of claim 14, wherein the holding arm comprises a plurality of bale gripping teeth pitched upwards at an angle of between 45 and 75 degrees from the holding arm.

\* \* \* \* \*